United States Patent
Wright (10) Patent No.: US 9,309,739 B2
(45) Date of Patent: Apr. 12, 2016

(54) STAB CONNECTOR ASSEMBLY AND METHODS USABLE FOR ESTABLISHING A FLUID CONNECTION

(71) Applicant: David Wright, Spring, TX (US)

(72) Inventor: David Wright, Spring, TX (US)

(*) Notice: Subject to any disclaimer, the term of this patent is extended or adjusted under 35 U.S.C. 154(b) by 144 days.

(21) Appl. No.: 14/083,754

(22) Filed: Nov. 19, 2013

(65) Prior Publication Data
US 2015/0136408 A1    May 21, 2015

(51) Int. Cl.
| E21B 17/046 | (2006.01) |
| E21B 33/038 | (2006.01) |
| F16L 37/086 | (2006.01) |

(52) U.S. Cl.
CPC ............. *E21B 33/038* (2013.01); *E21B 17/046* (2013.01); *F16L 37/086* (2013.01)

(58) Field of Classification Search
CPC .................................................. E21B 17/046
USPC ............................ 166/344; 285/374, 403, 404
See application file for complete search history.

(56) References Cited

U.S. PATENT DOCUMENTS

| 2,457,251 | A | * | 12/1948 | Main, Jr ................. F16L 37/107 |
| | | | | 137/599.02 |
| 3,439,944 | A | * | 4/1969 | Leutenegger ................. 285/321 |
| 3,551,005 | A | * | 12/1970 | Brun ...................... E21B 33/038 |
| | | | | 166/341 |
| 3,773,360 | A | * | 11/1973 | Timbers ........................ 285/307 |
| 4,863,314 | A | | 9/1989 | Baugh |
| 5,934,709 | A | * | 8/1999 | Morrison ........................ 285/39 |
| 6,009,950 | A | * | 1/2000 | Cunningham et al. ......... 166/344 |
| 6,106,026 | A | * | 8/2000 | Smith, III ................. F16L 1/26 |
| | | | | 285/84 |
| 7,225,877 | B2 | | 6/2007 | Yater |
| 7,469,933 | B2 | * | 12/2008 | Swift ................... F16L 37/0847 |
| | | | | 285/313 |
| 7,533,907 | B2 | * | 5/2009 | Swift et al. ..................... 285/321 |
| 7,585,001 | B2 | | 9/2009 | Rose |
| 8,087,465 | B2 | * | 1/2012 | Huang et al. ................... 166/339 |
| 8,096,731 | B2 | | 1/2012 | Piper et al. |
| 8,469,107 | B2 | * | 6/2013 | O'Malley .............. E21B 23/004 |
| | | | | 166/330 |
| 8,662,181 | B2 | * | 3/2014 | Hamblin et al. .............. 166/338 |
| 8,814,219 | B2 | * | 8/2014 | Hennemann et al. ........... 285/39 |
| 8,939,214 | B2 | * | 1/2015 | Litherland et al. ............ 166/343 |
| 2007/0184683 | A1 | | 8/2007 | Barber |
| 2012/0328371 | A1 | * | 12/2012 | Munstereifel et al. ........ 405/169 |

FOREIGN PATENT DOCUMENTS

| EP | 0146336 A2 | 6/1985 |
| WO | WO2012/163784 A1 | 12/2012 |

* cited by examiner

*Primary Examiner* — Matthew R Buck (57) ABSTRACT

Systems and methods enable connection of, and are usable to connect, well servicing equipment to other well equipment, including wellheads, blowout preventers, and other well servicing equipment. The systems comprise connecting apparatus having a male connector and female connector. The male connector comprises an elongate body having an axial bore extending therethrough and a plurality of protrusions extending from the elongate body at an angle relative to the axial bore. The female connector can be adapted for connection with the male connector, wherein engagement between the male connector and female connector communicates the axial bore of the male connector with a bore of the female connector to define a flowpath for communicating a medium. The systems and methods enable the ability to connect or disconnect well equipment remotely without the need of a diver, an ROV, and without the need to bring the well equipment to the surface for disassembly.

17 Claims, 7 Drawing Sheets

STAB CONNECTOR ASSEMBLY AND METHODS USABLE FOR ESTABLISHING A FLUID CONNECTION

FIELD

Embodiments usable within the scope of the present disclosure relate, generally, to subsea fluid connector assemblies and methods usable to establish fluid connection between pressurized fluid lines and subsea equipment and, more specifically, to connector assemblies comprising a male stab connector and a female receptacle connector usable for establishing a sub-sea fluid connection between fluid conduits and wellheads, blow out preventers, or other items of subsea equipment and to methods of establishing the same.

BACKGROUND

As offshore drilling and completion operations progress into deeper waters, especially in depths of water greater than 1000 feet, many relatively simple surface operations become complex and costly. One frequent operational requirement is that of engaging a stab connector with a receptacle connector for the purpose of applying hydraulic flow and pressure to operate or drive a function.

In many situations, interventions are required to maintain the performance of an oil or gas well. Interventions typically include removing debris from a well, shifting production levels in a well, unloading fluid from a well, stimulation of a production zone, well logging, as well as other well operations. Often, interventions require injection of one or more fluids into a well, for example, water, nitrogen, hydrate inhibitors, acids, and cements. Such fluids may be transported to the well site, stored in transportable containers, and then pumped into well with specialized pumping equipment.

Subsea well interventions can be more complicated due to inaccessibility of the well. A typical subsea well intervention includes utilization of a mobile offshore drilling unit and related specialized equipment. Subsea stab connector assemblies (or "hot stab") are commonly used to connect underwater piping or equipment. Stab assemblies are generally configured as two-component assemblies that include a female "receptacle" and a male insert called a "stab." The female receptacle is typically attached to subsea equipment or a subsea structure. The corresponding stab is often connected to hoses or hydraulic lines, running to surface equipment or facilities. The stab is typically configured for manipulation by a remote operated sub-sea vehicle (ROV) or manually by a diver. During use, the ROV or diver inserts the stab into the receptacle to connect the sub-sea equipment to the surface equipment or facilities.

These types of operations have seen a history of field problems in that the force of insertion is somewhat unpredictable depending on a number of factors, such as percent squeeze of the seals, surface finishes, shape of entrance chamfers, hardness of the seal members, cross sectional area of the seal members, and the outer diameter of the seal members.

Therefore, there is a need for a stab connector that can be quickly and easily engaged and disengaged from a receptacle connector.

Performing maintenance on subsea connectors is difficult and expensive. A need therefore exists for a stab connector assembly having a simple and reliable design that is not susceptible to contamination, is easy to maintain, and provides the ability to reliably and securely form a connection.

A need also exists for well equipment connectors that can communicate fluids at high pressures and withstand strong linear and bending forces exerted on the stab connector.

SUMMARY

Embodiments usable within the scope of the present disclosure includes a system for establishing a fluid connection comprising a male connector and a female connector.

The male connector can comprise an elongate body having a bore extending longitudinally therethrough and a plurality of cavities on an outer surface of the elongate body. The male connector can further comprise a plurality of protrusions extending from the plurality of cavities along a radial axis, wherein the plurality of protrusions are biased in an extended position. The plurality of protrusions can retract into the plurality of cavities. The system can further comprise a sleeve slidably positioned about the elongate body, wherein the sleeve can be adapted to force the plurality of protrusions into the plurality of cavities. The female connector can comprise a tubular body having a bore extending longitudinally therethrough and a plurality of apertures extending radially therethrough. In an embodiment, the elongate body of the male connector can be adapted to enter the tubular body of the female connector. The bore of the male connector and the bore of the female connector can be adapted to join together to define a flowpath for communicating a medium. The plurality of protrusions can be adapted to extend through the plurality of apertures to lock the male connector within the female connector to define an engaged fluid connector position.

Embodiments usable within the scope of the present disclosure include a fluid connector system comprising a male connector and a female connector. The male connector can comprise a male body having an axial bore extending therethrough and a plurality of retractable latches positioned about the male body. Each retractable latch can be adapted to move toward and away from the male body. Each retractable latch can comprise at least one latch surface oriented diagonally with respect to a longitudinal axis of the male body. The female connector can comprise a female body having an axial bore extending therethrough and a plurality of holes extending laterally therethrough. Each hole can be adapted to receive at least one retractable latch of the plurality of latches. The system can further include a sleeve adapted to contact the plurality of retractable latches and force the plurality of retractable latches toward the male body. In an embodiment of the fluid connector system, the male connector is adapted to enter the female connector, wherein the male connector and the female connector can be adapted to lock together and form a continuous flowpath extending therethrough.

Embodiments usable within the scope of the present disclosure include methods for connecting and disconnecting a fluid connector assembly. The method can comprise the steps of locking a male connector with a female connector, sliding a sleeve into contact with a plurality of protrusions extending from the male connector through a plurality of apertures in the female connector, forcing the plurality of protrusions to retract into an elongate body of the male connector to unlock the male connector from the female connector, and moving the male connector out of a tubular body of the female connector.

BRIEF DESCRIPTION OF THE DRAWINGS

In the detailed description of various embodiments usable within the scope of the present disclosure, presented below, reference is made to the accompanying drawings, in which.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," "front," "back," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

Figure 1:
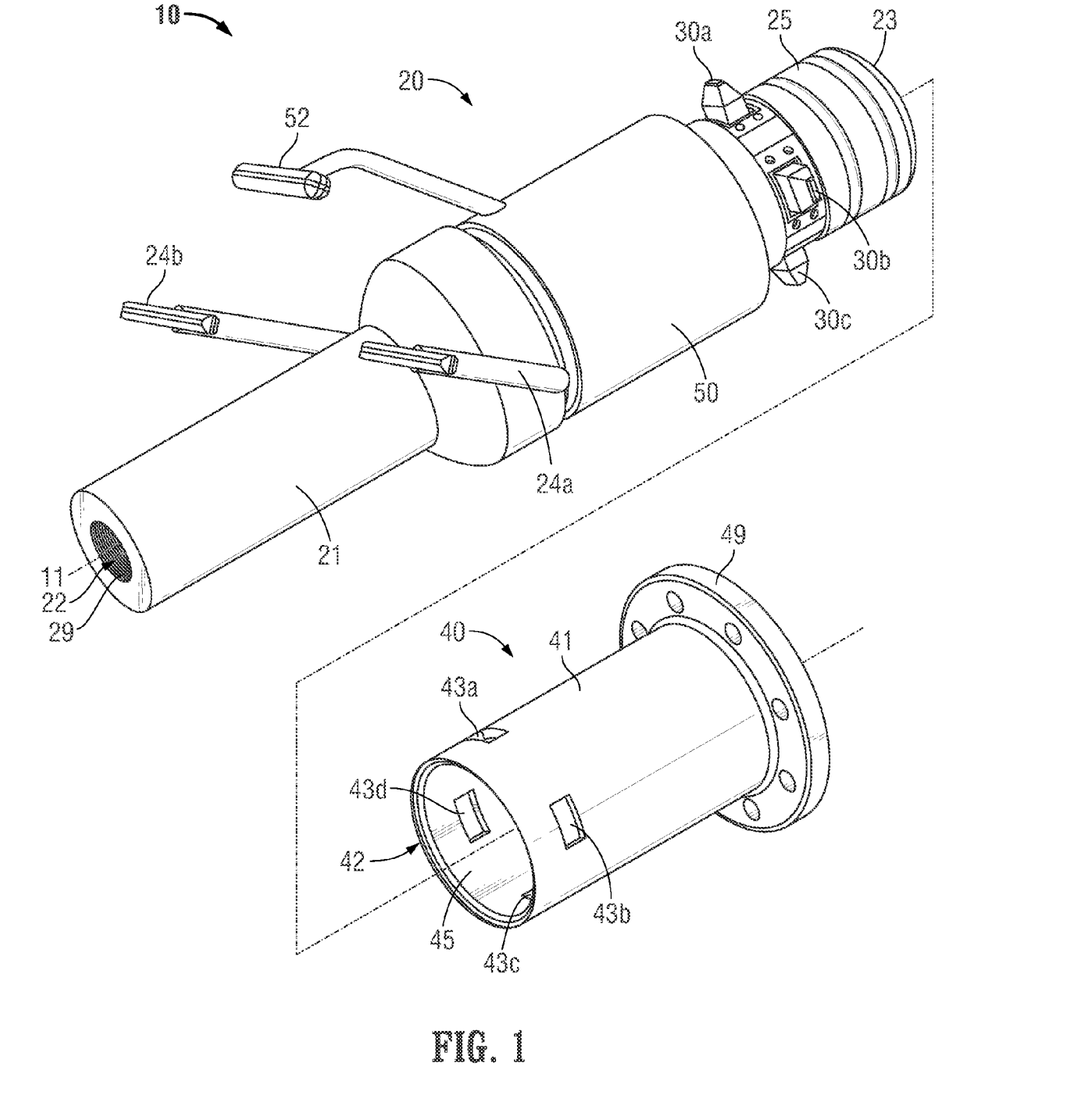
FIG. 1 depicts an isometric view of an embodiment of an unengaged connector apparatus usable within the scope of the present disclosure.

Referring now to FIG. 1, the figure shows an isometric view of an embodiment of a connector apparatus (10) usable within the scope of the present disclosure. The depicted connector apparatus includes a male connector, called a stab (20), and a female connector, called a receptacle (40). As further depicted in FIGS. 4 and 5, the stab (20) and the receptacle (40) are shown comprising bores (22, 42) extending therethrough, such that, when the stab (20) and the receptacle (40) are engaged, a continuous passageway is formed for allowing a medium, such as fluid (e.g., hydraulic fluid, production fluid, various chemicals, etc.), through the connector apparatus (10). For example, a flexible conduit (not shown), which communicates a fluid from a fluid source (not shown), can be connected to the stab (20), while a piece of equipment (not shown), such as a subsea manifold, wellhead, or a Blow Out Preventer (BOP), can be connected to the receptacle (40), allowing fluid communication between the fluid source and the desired piece of well equipment, when the stab (20) and the receptacle (40) are engaged, as depicted in the embodiments of the connector apparatus in FIGS. 2 and 3.

Figure 2:
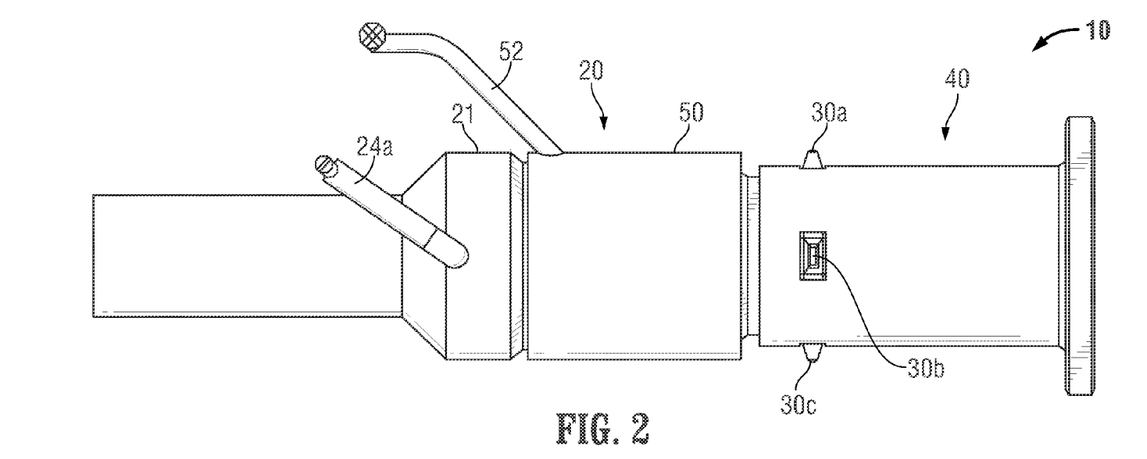
FIG. 2 depicts a side view of an embodiment of an engaged connector apparatus usable within the scope of the present disclosure.
Figure 3:
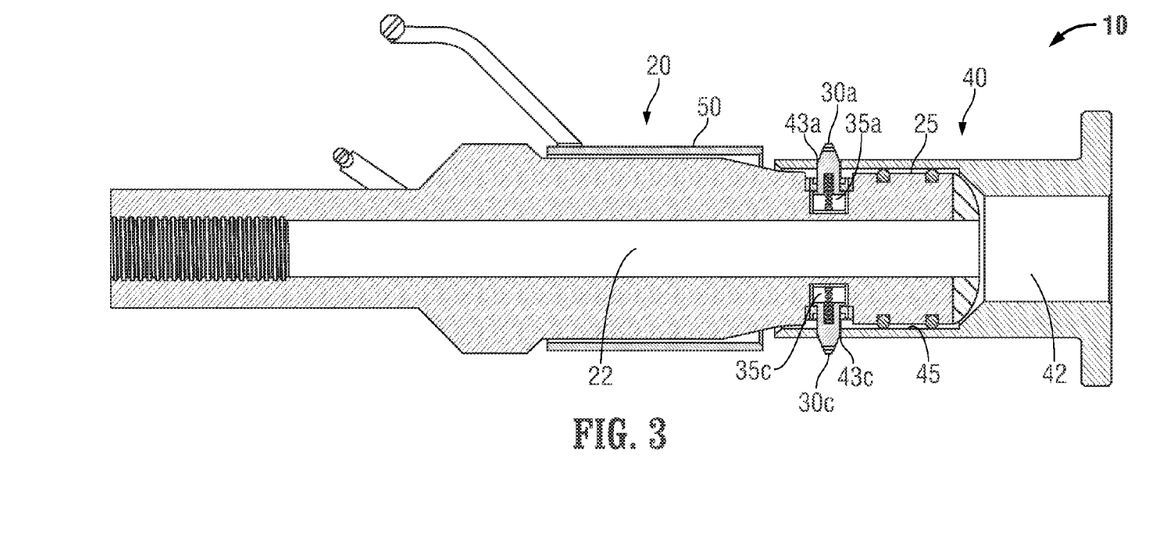
FIG. 3 depicts a cross-sectional side view of an embodiment of the engaged connector apparatus shown in FIG. 2.
Figure 4:
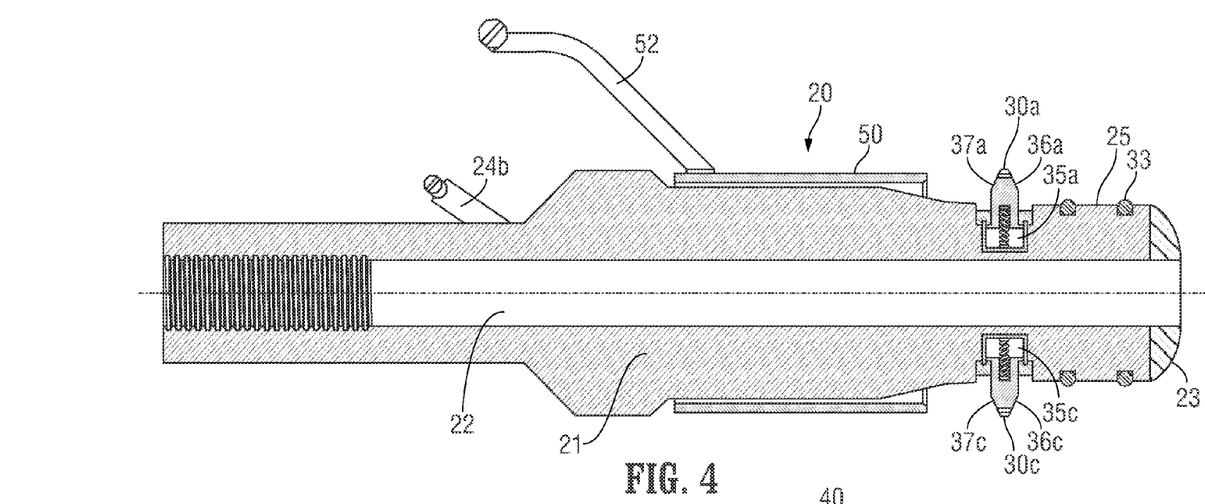
FIG. 4 depicts a cross-sectional side view of an embodiment of the male connector of the connector apparatus shown in FIG. 1.

Referring again to FIG. 1, an isolateral view of an embodiment of the connector assembly (10), and to FIG. 4, a cross-sectional side view of an embodiment of the stab (20), usable within the scope of the present disclosure, are shown. The stab (20) is shown having a generally tubular elongate body (21) and a fluid passageway (22) (e.g., an axial bore) along a longitudinal axis (11) thereof and extending the length of the stab (20). As depicted in FIGS. 1 and 4, the stab (20) comprises a rounded nose cone (23), which aids insertion into the bore (42) of the receptacle (40), through contact between the nose cone (23) and the tubular body (41) of the receptacle (40). Specifically, the sealing surface (45) of the tubular body (41), guides the stab (20) into an engaged position, as depicted in FIGS. 2 and 3. To prevent or reduce damage to the receptacle (40) upon insertion, the nose cone (23) can be constructed from a material that is softer than that the receptacle (40), including delrin or other plastics, bronze or other soft metals, or any other rigid material that is softer than the body (41) of the receptacle (40).

FIGS. 1 and 4 further depict an embodiment of the stab (20) comprising an external sealing section (25), which forms a fluid seal against the sealing surface (45) of the receptacle (40). The external sealing section (25) is configured for entry within the bore (42) of the receptacle (40), causing engagement between the sealing elements (33) and the sealing surface (45) of the receptacle (40). The depicted external sealing section (25) can include sealing elements, such as O-rings (33) to prevent fluids from breaching the connector assembly (10) when the external sealing section (25) is engaged with a corresponding sealing surface (45) of the receptacle (40). It should be understood that in alternate embodiments, the manner of creating a fluid seal between the stab (20) and the receptacle (40) can include any type, configuration, number, and/or combination of sealing elements, including elastomeric seals, gaskets, metal or elastomeric rings, cup seals, metal-to-metal seals, and/or other types of sealing elements. The sealing members may also include one or more bidirectional or unidirectional sealing elements (not shown), such as cup seals, oriented in opposite directions. Such seal configuration can prevent fluid from breaching the connector assembly during operations involving positive or above ambient internal fluid pressures. The described seal configuration can prevent fluids from breaching into the connector assembly during operations involving vacuum pressures, or when communicating fluids at pressures that are below ambient fluid pressures.

Figure 8A:
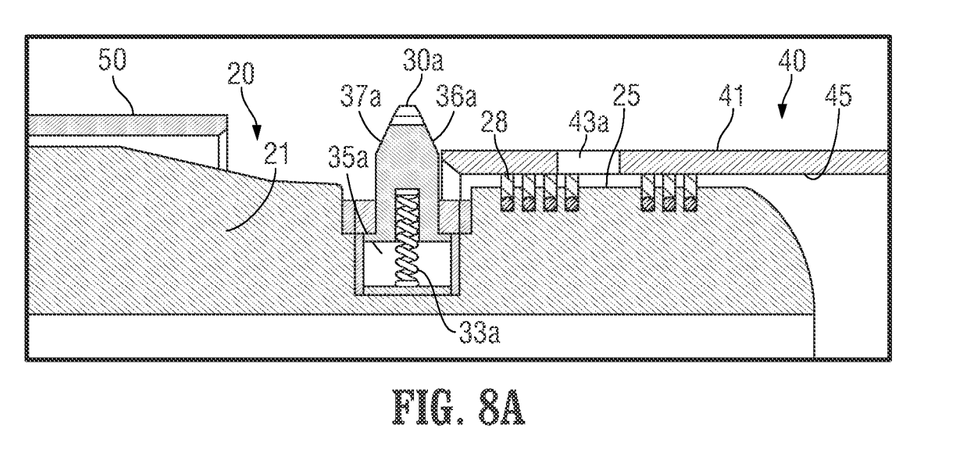
FIG. 8A depicts a cross-sectional close-up side view of a portion of an embodiment of the connector apparatus of FIG. 1, prior to engagement.
Figure 8B:
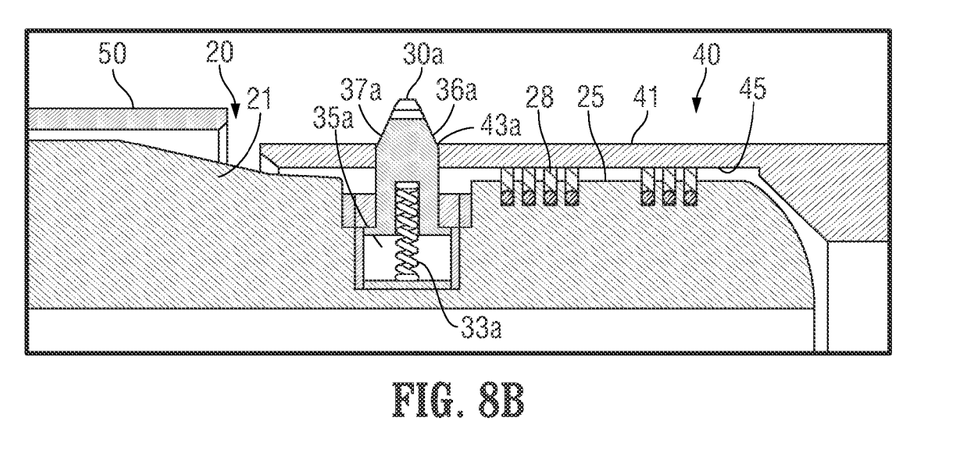
FIG. 8B depicts a cross-sectional close-up side view of a portion of an embodiment of the connector apparatus of FIG. 1, in the engaged position.
Figure 8C:
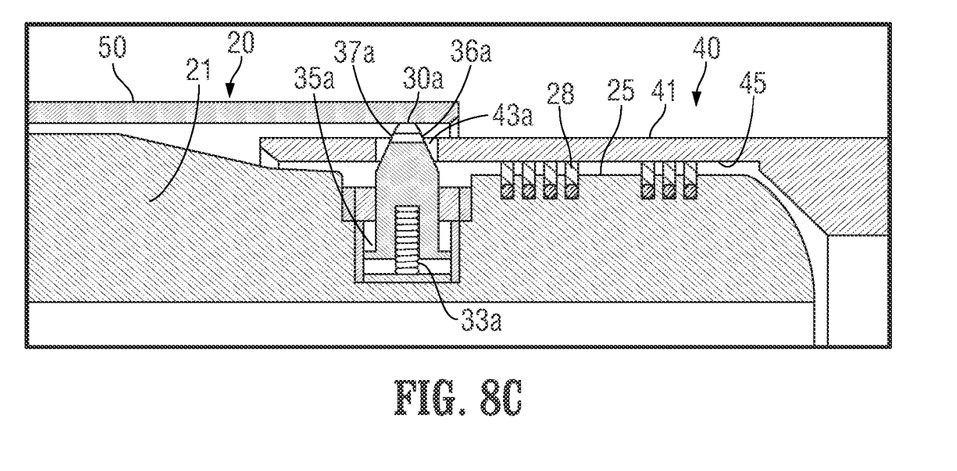
FIG. 8C depicts a cross-sectional close-up side view of a portion of an embodiment of the connector apparatus of FIG. 1, during disengagement process.

In an alternate embodiment of the stab (20), the sealing section (25) may include a plurality of wear-resistant ring/O-ring assemblies (28), as depicted in FIGS. 8A-8C. At zero or low pressures, the outer wear-resistant rings may be energized by the inner O-rings to provide a sealing force against the sealing surface (45). As the pressure of the internal fluid increases, the outer wear resistant rings may be energized by fluid pressure, forcing them against the sealing surface (45). Typically, wear-resistant rings are constructed from PTFE and the O-rings are constructed from NBR. Although FIGS. 8A-8C depict seven ring assemblies (28) configured in two groups, it should be understood that any number and size of ring assemblies (28) can be selected based on specific applications and pressures involved. For example, in another embodiment (not shown), the sealing section (25) may include 12 ring assemblies (28) divided into two groupings of five and seven ring assemblies (28).

As further depicted in the embodiment of FIGS. 1 and 4, the male stab (20) is shown comprising four protrusions, called latches (30a-d, 30d not shown), extending radially outward from respective cavities (35a-d, 35b and 35d not shown) in the stab body (21) adjacent to the sealing region (25). It should be understood that while the present embodiment comprises four latches (30a-d) spaced equidistantly (i.e. 90 degrees apart) about the body (21) of the stab (20), alternate embodiments (not shown), usable within the scope of the present disclosure, can include any number of latches spaced about the body (21) at any desired distances from each other.

Figure 6A:
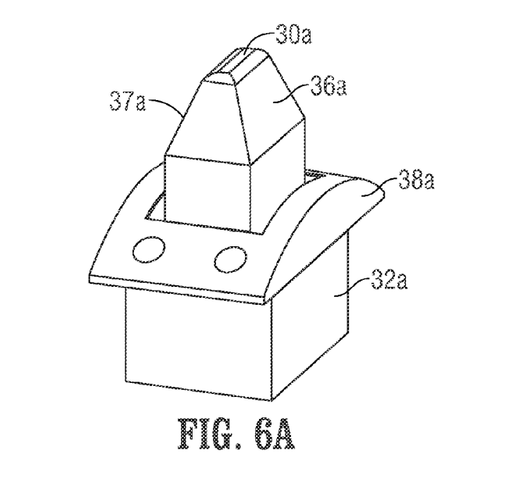
FIG. 6A depicts an isometric view of an embodiment of a latch of the male connector shown in FIG. 4.
Figure 6B:
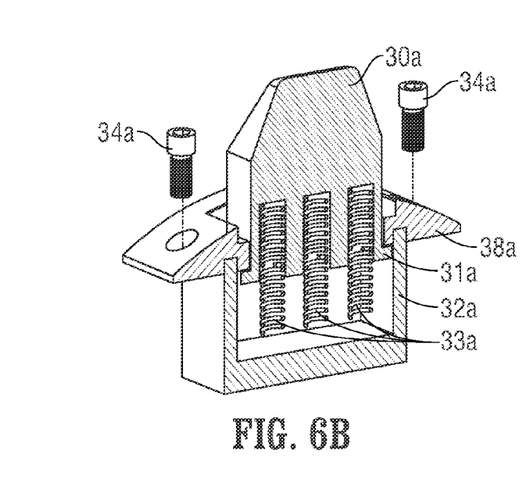
FIG. 6B depicts a cross-sectional side view of an embodiment of the latch shown in FIG. 6A.

Referring now to FIGS. 6A and 6B, close-up views of an embodiment of the first latch (30a), usable within the scope of the present disclosure, is shown. For clarity purposes, only a description of the first latch (30a) and related adjacent components is included. However, it should be understood that the description of the structure and function of the first latch (30a), and the adjacent components described below, can be applicable to the remaining latches (30b-d, as shown in FIGS. 1 and 7a-c) and adjacent components, which comprise the same structure and function.

Specifically, FIGS. 6A and 6B show the first latch (30a) being positioned within a latch housing (32a) and supported vertically by a set of springs (33a), located within the latch housing (32a), which force the latch (30a) to extend outwards in its normal position. Furthermore, a retainer plate (38a) maintains the latch (30a) and the latch housing (32a) within the latch cavity (35a, see FIG. 4). As shown in FIGS. 6A and 6B, the first latch (30a) comprises a latch base (31a), which abuts the retainer plate (38a) in the extended latch position, preventing the latch (30a) from being ejected from the latch housing (32a) by the springs (33a). The retainer plate (38a) also abuts the top portion of the latch housing (32a), maintaining it within the cavity (35a, see FIG. 4). The retainer plate (38a) can be fixedly attached to the stab body (21) by a plurality of threaded bolts (34a). As explained in detail below, in the course of the stab (20) connection and disconnection procedures from the receptacle (40), the latch (30a) can be retracted into the latch housing (32a), and therefore into the cavity (35a), by pushing the latch (30a) into the housing (32a) with sufficient force to compress the springs (33a).

Furthermore, as depicted in the embodiments of FIGS. 4 and 6A, the latches (30a-d, 30b and 30d not shown) comprise front sloped surfaces (36a-d, 36b and 36d not shown) and back sloped surfaces (37a-d, 37b and 37d not shown), which are shown oriented diagonally with respect to the longitudinal axis (11). Once again, describing only the first latch (30a) for clarity purposes, it should be understood that the remaining latches 30b-d) comprise the same structure and function. In the embodiments depicted in FIGS. 4 and 6A, the first latch (30a) comprises a front sloped surface (36a) on the side of the latch (30a) and a back sloped surface (37a) on the other side of the latch (30a). The sloped surfaces (36a, 37a) can be used to transfer direction of a force, wherein lateral forces directed at the front and back sloped surfaces (36a, 37a) can be directed to compress the latch (30a), forcing it to retract into its cavity (35a). Specifically, during stab connection operations, the latch (30a) can be retracted through lateral contact between the receptacle body (41) (see FIG. 1) and the front sloped surface (36a) of the latch (30a) and, during stab disconnection operations, between a sliding sleeve (50).

As depicted in FIG. 3, when extended out of the cavity (35a), the first latch (30a) comprises a length sufficient to extend through a receptacle aperture (43a, see also FIG. 5) and to a height that allows an edge of the sleeve (50) to make contact with the latch (35a). In the embodiments depicted in FIGS. 4 and 6A, the front and the back surfaces (36a, 37a) are sloped at about 30 degrees from the vertical. However, it should be understood that sloped surfaces (36a, 37a) having smaller or larger slope angles (not shown), which may range between 20 and 70 degrees from the vertical, may be incorporated in alternate embodiments and are within the scope of the present disclosure. Furthermore, although the embodiments depicted in FIGS. 4, 6A, and 6B show the first latch (30a) having a rectangular base, alternate embodiments (not shown) may comprise latches having a square or a round base, which can be usable within the scope of the present disclosure.

Referring again to the embodiments shown in FIGS. 1 and 4, the stab (20) further comprises a sleeve (50) positioned about the stab body (21). The sleeve comprises a generally tubular configuration having a tapered or a cone shaped front edge, adapted to contact the latches (30a-d, 30d not shown), and a handle (52) attached adjacent to the back end of the sleeve (50). The sleeve (50) can be positioned about the tubular body, (21) adjacent to the latches (30a-d), wherein the tubular body (21), which supports the sleeve (50), has an increased diameter, which approximately equals the outside diameter of the tubular body (41) of the receptacle (20). The sleeve (50) is slidably positioned about the stab body (21), having an inside diameter sufficiently larger to allow the sleeve (50) free movement thereon. Such configuration allows the sleeve (50) to slide onto the receptacle tubular body (41) during disconnection procedures.

Figure 7A:
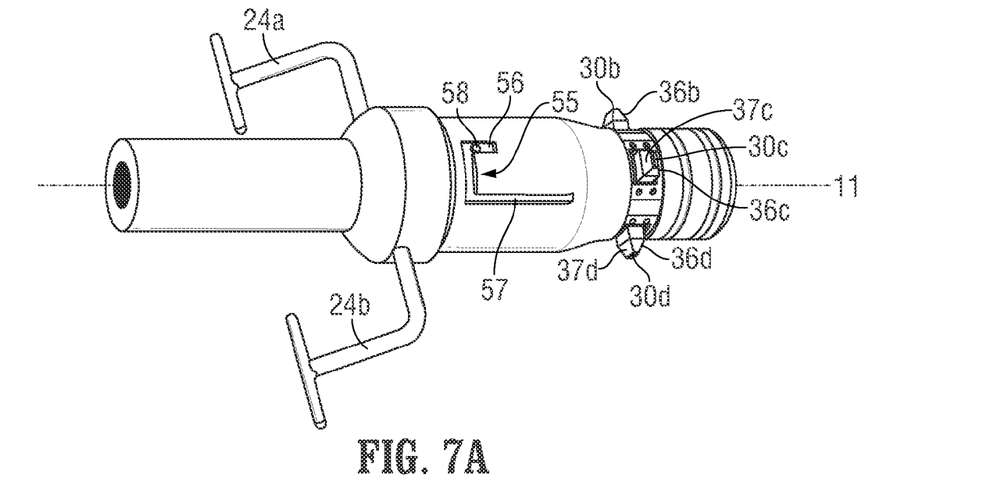
FIG. 7A depicts a side view of an embodiment of a J-slot of the male connector shown in FIG. 4.
Figure 7B:
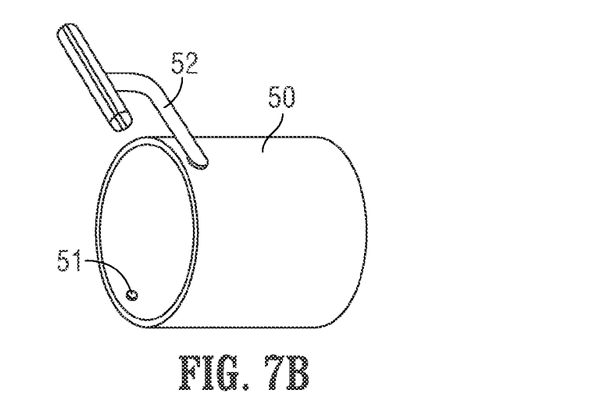
FIG. 7B depicts an isometric view of a sleeve of the male connector shown in FIG. 4.
Figure 7C:
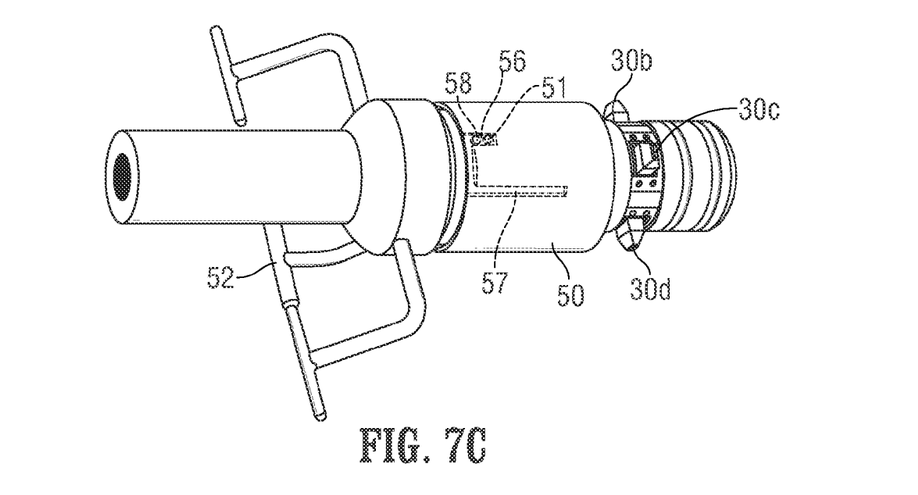
FIG. 7C depicts a diagrammatic side view of the male connector shown in FIG. 4.

The stab body (21) can retain the sleeve (50) in position and can guide its movement about the receptacle during stab (20) disconnection operations by way of a J-slot and pin system. As shown in embodiments depicted in FIGS. 7A and 7C, the J-slot (55) is located on the surface of the stab body (21), comprising a short and a long slot (56, 57). As shown in the embodiment depicted in FIG. 7B, the sleeve (50) comprises a locator pin (51), positioned adjacent to the back edge of the sleeve (50). As the sleeve is positioned about the tubular body (21), the locator pin (51) can be positioned within the J-slot (55), as depicted in FIG. 7C, to guide the movement of the sleeve (50) during stab disconnection operations. During stab disconnection operations, the locator pin (51) is moved along the long slot (57), allowing the sleeve (50) to be moved longitudinally until the front edge of the sleeve (50) makes contact with the back sloped surfaces (37a-d, 37a-b not shown in FIGS. 7A-7C). When not in operation, the sleeve (50) can be maintained in the retracted position by sliding and locking the locator pin (51) in the short slot (56). The short slot (56) can include a spring extended protrusion or a detent pin (58), which traps the locator pin (51) in the short slot (56), and prevents movement of the sleeve (50) when not in operation. The sleeve (50) can be freed by pulling the sleeve (50) with sufficient force, causing the locator pin (51) to compress the detent pin (58), thus allowing the locator pin (51) to move into and along the long slot (57).

As depicted in the embodiment of FIG. 1, the sleeve (50) can be actuated by using an extended handle (52) connected to the exterior of the sleeve (50), thereby allowing manual operation of the sleeve (50) by a diver (not shown). In an alternate embodiment (not shown), the sleeve and/or the handle may be adapted for actuation by an ROV, wherein the sleeve and/or the handle may include gripping surfaces configured to be grasped by a ROV arm. In another alternate embodiment (not shown), the sleeve and/or the handle may be connected directly to a remote actuator, such as a hydraulic cylinder, wherein an operator can remotely actuate the cylinder, causing the sleeve to extend and retract when desired. In another embodiment (not shown), the hydraulic cylinder may be activated locally by a diver.

The embodiment of the stab (20) depicted in FIG. 1 also comprises two stab handles (24a, 24b) usable to manually grip and maneuver the stab (20) by a diver (not shown). As depicted in FIGS. 1 and 7a, the handles can be attached directly to the body (21) of the stab (20). However, in an alternate embodiment (not shown), the handles can be attached to an intermediate collar, which is clamped about the stab body by bolts. Such configuration allows the handles to be interchanged, by disconnecting the intermediate collar from the body and replacing them with a different collar/handle assembly designed for a different environment or a different operator. In another alternate embodiment (not shown), the stab handles may be adapted for actuation by an ROV, wherein the handle may include gripping surfaces configured to be grasped by an ROV.

Referring again to FIG. 1, the stab (20) terminates with an end connection adapted to make a fluid connection with a fluid conduit. As depicted, the end connection can comprise a female thread (29) that can be adapted to receive a male thread of a fluid supply line. Alternate embodiments of the end connection may include any connection type enabling fluid transfer therebetween. For example, the end connection may comprise a male thread, a flange connection, or any other fluid connector configured for attachment to a hydraulic line, pneumatic line, pipe, tube, or any other fluid conduit. As depicted in FIG. 1, the end connection can be integrally formed with the stab body (21), or, alternatively, manufactured separately and secured to the body (21) by any available means, such as welding or a threaded connection.

Figure 5:
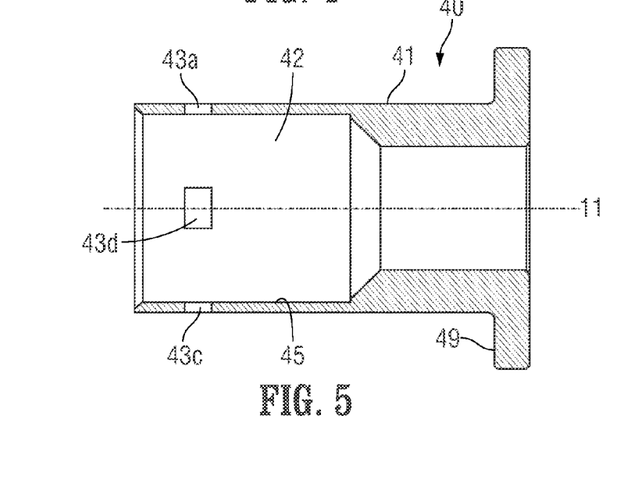
FIG. 5 depicts a cross-sectional view of an embodiment of the female connector of the apparatus shown in FIG. 1.

Referring now to FIGS. 1 and 5, an isometric and a cross-sectional side view of an embodiment of a receptacle (40), usable within the scope of the present disclosure, is shown. The receptacle (40) is shown comprising a tubular body (41) and an end connection configured to make a fluid connection with subsea equipment. In the embodiment depicted in FIGS. 1 and 5, the end connection comprises a flange (49), which can be used to connect the receptacle (40) to a fluid conduit,
a wellhead, a BOP, or another piece of subsea equipment (not shown). Alternate embodiments of the end connection may include any connection type enabling fluid transfer between the receptacle (40) and subsea equipment. For example, the connecting end may comprise a female thread, a male thread, other types of flanges, or any other means of fluid connection configured for connection to a hydraulic line, pneumatic line, pipe, tube, or any other fluid conduit (not shown). The end connection may be integrally formed with the body (41) or manufactured separately and secured to the body (41) by any available means, such as welding or a threaded connection.

The tubular body (41) has a generally cylindrical configuration, comprising an axial bore (42) extending therethrough and four apertures (43a-d, 43c not shown) extending radially therethrough at the front edge of the receptacle, opposite the flange (49). The apertures (43a-d) can be symmetrically spaced relative to each other and configured to receive the four latches (30a-d, 30d not shown) extending from the stab (20). The tubular body (41) can comprise a tapered or a cone shaped front edge, which can contact the latches (30a-d) during stab connection operations. The cone shaped front edge can lessen the friction between the body (41) and the latches (30a-d), allowing the latches to retract into their cavities (35a-d, see FIG. 4) with less required force to be exerted by the operator (not shown). Furthermore, the internal surface of the body (21), adjacent to the front edge, is referred to as the internal sealing surface (45) and can be adapted to receive the sealing section (25) of the stab (20). Specifically, when the stab (20) and the receptacle (40) are engaged, as depicted in FIG. 3, the sealing section (25) forms a fluid seal against the internal sealing surface (45), preventing fluids from breaching the connector assembly (10). While the embodiment depicted in FIGS. 1 and 5 includes four apertures (43a-d), which are generally equidistantly spaced about the body of the receptacle, other embodiments (not shown), usable within the scope of the present disclosure, can include any number, shape, size, and/or configuration of receptacles adapted to accept the corresponding latches.

Although FIGS. 1, 4, and 5 depict the sleeve (50) being positioned about the body (21) of the stab connector (20), other embodiments (not shown) having a sleeve (50) positioned about the body (41) of the receptacle (40), are also within the scope of the present disclosure. Specifically, the sleeve (50) may be positioned between the apertures (43a-d) and the end connector (49). The sleeve (50) may include a handle (52) adapted to be grasped by a diver or a ROV (not shown). The sleeve (50) can be actuated by one or more fluid actuators (not shown), such as hydraulic cylinders, which would enable remote disconnection between the stab (20) and the receptacle (40). The sleeve can also include a guide pin (51) for movement within a channel (57) along the body of the receptacle (40), as depicted in FIG. 7B.

Embodiments usable within the scope of the present disclosure also relate to methods for establishing and terminating a fluid connection. Referring again to FIG. 1, an isolateral view of an embodiment of the connector apparatus (10) is shown, wherein the stab (20), which can be attached to a fluid conduit/source at the end connection (29), is being moved toward engagement with the receptacle (40), which can be attached to subsea or well equipment (e.g., a BOP, wellhead, etc.) at its end connection (49). A diver or a ROV (not shown) can maneuver the stab (20) during this process.

While engaging the stab (20) with the receptacle (40), the operator aligns the four latches (30a-d, 30d not shown) with the four apertures (43a-d, 43d not shown). Proper alignment of the stab (20) with respect to the receptacle (40), allows the latches (30a-d) and the apertures (43a-d) to engage. As depicted in FIG. 8A, while the stab (20) enters the receptacle (40), the nose cone (23) can contact the internal surface of the receptacle tubular body (41), including the internal sealing surface (45), such that the stab (20) can be oriented into alignment for proper engagement with the receptacle (40). The soft nose cone (23) can guide the sealing section (25) into sealing engagement with the internal sealing surface (45) of the receptacle (40) and prevents or reduces surface damage to the sealing surface (45), thereby maintaining the capability to establish an effective fluid seal with the sealing section (25) of the stab (20).

As the sealing section (25) is maneuvered into the sealing surface (45), the edge of the body (41) can contact the front sloped surface (36a-d, 36b-d not shown) of the latches (30a-d, 30b-d not shown). Moving the stab (20) further into the receptacle (40), causes the tapered edge of the body (41) to force the latches (30a-d) to retract into their respective receptacles (35a-d, 35b-c not shown), overcoming the force of the springs (33a-d, 33b-d not shown). As the latches (30a-d) become aligned with the receptacles (43a-d, 43b-d not shown), they extend therethrough, locking the stab (20) within the receptacle (40), as depicted in FIG. 8B.

As described above, the latches (30a-d) extend radially from within their respective cavities (35a-d) in the body (21). In the disengaged connector (10) position, as depicted in FIG. 8A, the latches (30a-d) are positioned outside their respective apertures (43a-d), while in the engaged connector (10) position, as depicted in FIG. 8B, the latches (30a-d) extend through their respective apertures (43a-d). As the latches (30a-d) extend through the apertures (43a-d), they abut the walls of the apertures (43a-d), i.e. the body (41) of the receptacle (40), which prevents lateral movement thereof; and therefore, prevents disconnection between the stab (20) and the receptacle (40). Once the stab (20) fully engages the receptacle (40), the sealing section (25) seals against the internal sealing surface (45), preventing fluids from breaching the connector assembly (10).

Embodiments usable within the scope of the present disclosure also relate to methods for disengaging a fluid connector assembly (10). Referring again to FIG. 8B, a side cross sectional view of an embodiment of the connector assembly (10), in which the stab (20) and the receptacle (40) are in the engaged position is shown. To disengage the stab (20) from the receptacle (40), the latches (30a-d, 30b-d not shown) are retracted into their respective cavities (35a-d, 35b-d are not shown) by the sleeve (50). As depicted in FIG. 7C, the sleeve (50) can be maneuvered by using the handle (52) and guided by the locator pin (51), which moves along the short slot (56), past the detent pin (58) and into the long slot (57). The handle (52) and/or the sleeve (50) can be operated manually, by a ROV, or remotely by a hydraulic actuator (not shown). Thereafter, the sleeve (50) can be slid along the longitudinal axis (11), about the body (21) of the stab (20), and onto the body (41) of the receptacle (40), until the sleeve (50) comes into contact with the back sloped surfaces (37a-d, 37c-d not shown).

As the sleeve (50) advances against the back sloped surfaces of the latches (30a-d), the latches are forced to retract into their respective receptacles (35a-d), overcoming the force of the springs (33a-d). The cone shaped or inwardly tapered front edge of the sleeve (50) lessens the friction between the sleeve (50) and the latches (30a-d, 30c-d not shown), allowing the sleeve (50) to slide over the latches (30a-d) with lesser required force. Moving the sleeve (50) further forces the latches (30a-d) to retract into the cavities (35a-d, see FIG. 4) to a height such that the front sloped surfaces (37a-d) and the back sloped surfaces (38a-d, 36c-d not shown) are positioned adjacent to the walls of the receptacle apertures (43a-d, see FIG. 5). Once the sleeve (50) fully covers the receptacles (43a-d), the latches (30a-d) are sufficiently retracted to allow the stab (20) to be pulled out and fully disconnected from the receptacle (40). Subsequently, as the stab (20) is pulled from the receptacle (40), the latches (35a-d) are forced to retract further into the cavities (35a-d) until they exit the aperture (43a) and the stab (20) and the receptacle (40) can separate.

Figure 9:
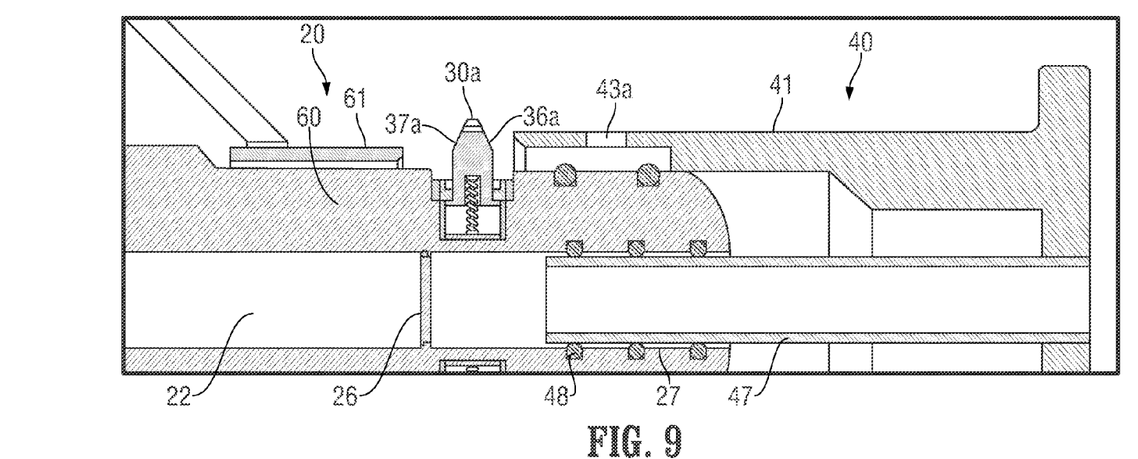
FIG. 9 depicts a cross-sectional side view of an alternate embodiment of the connector apparatus of FIG. 1, prior to engagement.

Referring now to FIG. 9, a cross sectional side view of an additional embodiment of a connector assembly (10), usable within the scope of the present disclosure, is shown. Specifically, FIG. 9 depicts an embodiment of the stab (20) comprising an internal sealing section (27), which seals against the internal tube (47) of the receptacle (40). The internal sealing section (27) can be configured to engage the external surface of the internal tube (47) of the receptacle, being slightly larger in diameter to enable sealing while, at the same time, allowing free movement therebetween. Although the depicted connector system (10) comprises O-ring seals (48), it should be understood that in alternative embodiments (not shown), the manner of sealing between the stab and the receptacle can include any type of sealing elements including gaskets, seal rings, cup seals, elastomeric seals, metal-to-metal seal, or other sealing members, and can include any configuration, number, and/or combination of these sealing elements. The sealing members may also include bidirectional or a plurality of unidirectional sealing elements oriented in opposite directions.

The embodiment, of the stab shown in FIG. 9, depicts a flopper valve (26) positioned along the axial fluid passageway (22). Located adjacent to the internal sealing section (27), the flapper valve (26) is spring actuated, having a normally closed configuration to prevent fluid flow in the downstream direction when disconnected from the receptacle (40). In the engaged position, the internal tube (47) forces the flopper valve (26) to open, enabling fluid flow through the connector assembly (10). Although FIG. 9 depicts a flopper valve (26), the use of other spring-actuated valves is within the scope of the present disclosure. In alternate embodiments of the stab (not shown), manual valves, such as needle valves or ball valves, may be used instead of, or in combination with, the flapper valve. In such embodiments, these manual valves may be hand actuated or adapted for remote and/or hydraulic actuation.

The embodiment of the stab (20) shown in FIG. 9 also depicts a sleeve (61) having a diameter that is adapted to slide about the stab body (60) and into the annular space between the stab body (60) and the receptacle body (41) to in order to make contact with the back sloped surfaces (37a, 37b-d not shown) to force the latches (30a-d, 30b-c not shown) to retract.

Figure 10A:
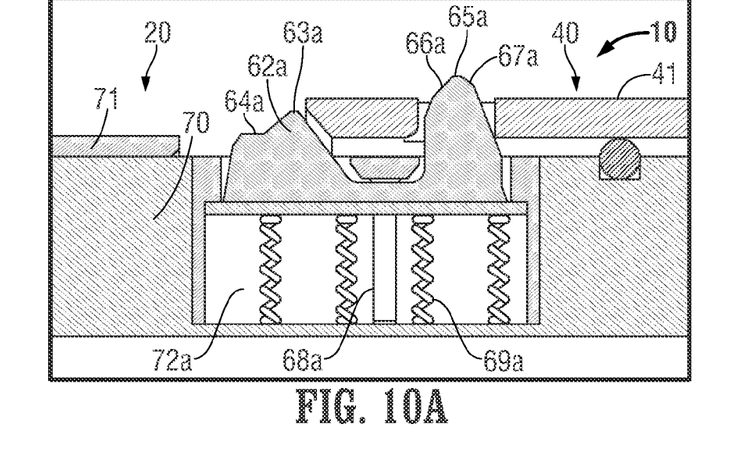
FIG. 10A depicts a cross-sectional close-up side view of a portion of an alternate embodiment of the connector apparatus of FIG. 1, in the engaged position.

Referring now to FIG. 10A, a cross sectional close-up view of an additional embodiment of a connector assembly (10), usable within the scope of the present disclosure is shown. Specifically, FIG. 10A depicts an alternate embodiment of the stab (20) having four latches (62a-d, 62b-d not shown), wherein each latch comprises two prongs (63a, 65a). For clarity purposes, the following description describes only the first latch (62a) and other components associated with the first latch (62a); however, it should be understood that the remaining latches (62b-d, not shown) can comprise the same structure and function. As shown, the latch (62a) comprises a first prong (63a) having a first sloped surface (64a) and a second prong (65a) having a second sloped surface (66a). The latch is also depicted having a plurality of springs (69a) and a guide pin (68a), usable to maintain the latch (62a) properly oriented within the cavity (72a).

Figure 10B:
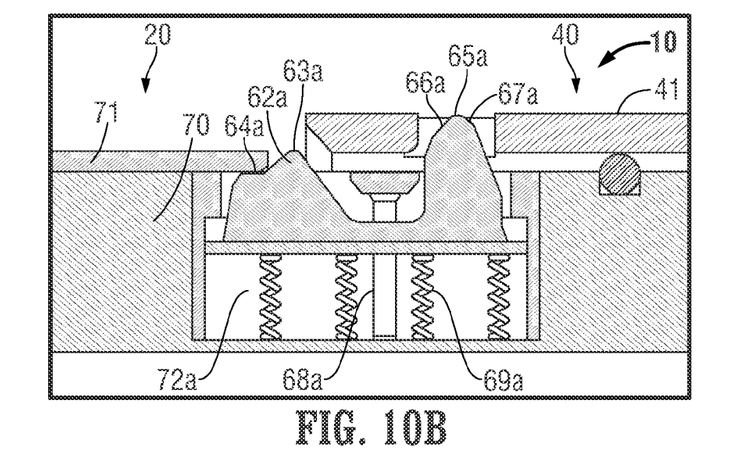
FIG. 10B depicts a cross-sectional close-up side view of a portion of an alternate embodiment of the connector apparatus of FIG. 1, during disengagement process.
Figure 10C:
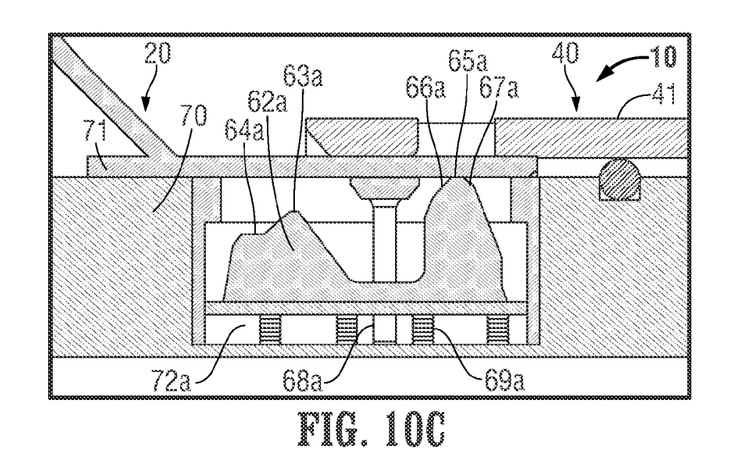
FIG. 10C depicts a cross-sectional close-up side view of a portion of an alternate embodiment of the connector apparatus of FIG. 1, during disengagement process.

Embodiments usable within the scope of the present disclosure also relate to methods for retracting the latch (62a) to enable engagement and disengagement between the stab (20) and the receptacle (40), as depicted in FIGS. 10A-10C. Referring again to FIG. 10A, a close-up sectional view of the connector apparatus (10) is shown, which includes the sleeve (71) positioned about the stab body (70), adjacent to the latch (62a). Thereafter, as depicted in FIG. 10B, the sleeve (71) is moved into contact with the first sloped surface (64a) of the first prong (63a), forcing the latch (62a) against the springs (69a) and into the cavity (72a). Simultaneously, the second prong (65a) is partially retracted from the first aperture (43a). As the sleeve (71) is moved further along the body (70), the sleeve (71) makes contact with the second sloped surface (66a) of the second prong (65a), forcing it to retract further into the cavity (72a). Once the sleeve (71) covers the peak of the second prong (65a), as depicted in FIG. 10C, the second prong (65a) is fully retracted from the aperture (43a) and the stab (20) can be removed from the receptacle (20).

Similarly, to connect the stab (20) and the receptacle (40), the above operations may be followed prior to inserting the stab (20) into the receptacle (40). Specifically, prior to insertion, the sleeve (71) may be moved along the body (70) and into contact with both prongs of the latch (62a), until it has fully retracted into the cavity (72a). Thereafter, the stab (20) can be inserted into the receptacle (40) and the sleeve (71) can be withdrawn allowing the second latch (65a) to extend into the aperture (43a) to lock the stab (20) within the receptacle (40)

While various embodiments usable within the scope of the present disclosure have been described with emphasis, it should be understood that within the scope of the appended claims, the present invention can be practiced other than as specifically described herein.

What is claimed is:

1. A system for establishing a fluid connection, the system comprising:
    a male connector comprising:
        an elongate body having a bore extending longitudinally therethrough, a plurality of cavities and a plurality of guide slots on an outer surface of the elongate body;
        a plurality of protrusions extending from the plurality of cavities along a radial axis, wherein the plurality of protrusions are biased in an extended position, wherein the plurality of protrusions are retractable into the plurality of cavities; and
        a sleeve slidably positioned about the elongate body, wherein the sleeve comprises a guide pin adapted for engagement with the plurality of guide slots, and wherein the sleeve is adapted to force the plurality of protrusions into the plurality of cavities; and
    a female connector comprising a tubular body having a bore extending longitudinally therethrough and a plurality of apertures extending radially therethrough,
    wherein the elongate body of the male connector is adapted to enter the tubular body of the female connector,
    wherein the bore of the male connector and the bore of the female connector are adapted to join together to define a flowpath for communicating a medium, and wherein the plurality of protrusions are adapted to extend through the plurality of apertures to lock the male connector within the female connector to define an engaged fluid connector position.

2. The system of claim 1, wherein the plurality of protrusions are spaced about the elongate body having a generally equal distance between each adjacent protrusion of the plurality of protrusions.

3. The system of claim 1, wherein each protrusion of the plurality of protrusions is adapted to extend beyond an outer surface of the tubular body of the female connector while in the engaged fluid connector position.

4. The system of claim 1, wherein the elongate body of the male connector forms a fluid seal against the tubular body of the female connector.

5. The system of claim 1, wherein the male connector further comprises an end member connected to an end of the elongate body, wherein the end member comprises plastic, delrin, a soft metal, or combinations thereof.

6. The system of claim 3, wherein each protrusion of the plurality of protrusions comprises a sloping surface, wherein the sloping surface is configured diagonally with respect to the radial axis, and wherein the sleeve contacts the sloping surface to force the plurality of protrusions to retract into the plurality of cavities.

7. The system of claim 1, wherein the sleeve is adapted to move about the outer surface of the tubular body of the female connector while in the engaged fluid connector position, and wherein the sleeve is adapted to force the plurality of protrusions into their respective cavities to allow the male connector to disconnect from the female connector.

8. The system of claim 6, wherein each protrusion of the plurality of protrusions comprises an additional sloping surface, wherein the additional sloping surface is configured diagonally with respect to the radial axis, and wherein the additional sloping surface is adapted to contact the tubular body of the female connector to force the plurality of protrusions to retract into the plurality of cavities.

9. The system of claim 1, wherein the sleeve is adapted to move into the bore of the female connector while in the engaged fluid connector position, and wherein the sleeve is adapted to force the plurality of protrusions into their respective cavities to allow the male connector to disconnect from the female connector.

10. A fluid connector system comprising:
    a male connector comprising:
        a male body having an axial bore extending therethrough;
        a plurality of retractable latches and plurality of guide slots positioned about the male body, wherein each retractable latch is adapted to move toward and away from the male body, wherein each retractable latch comprises at least one latch surface oriented diagonally with respect to a longitudinal axis of the male body;
    a female connector comprising:
        a female body having an axial bore extending therethrough and a plurality of holes extending laterally therethrough, wherein each hole is adapted to receive at least one retractable latch of the plurality of latches;
    a sleeve comprising a guide pin, wherein the sleeve is adapted to contact the plurality of retractable latches and force the plurality of retractable latches toward the male body, wherein the sleeve is adapted to slide about the male body by engaging the guide pin along the plurality of guide slots,
    wherein the male connector is adapted to enter the female connector,
    wherein the male connector and the female connector are adapted to lock together and form a continuous flowpath extending therethrough.

11. The system of claim 10, wherein the male body further comprises a plurality of cavities positioned on an external surface of the male body, and wherein each retractable latch of the plurality of latches is adapted to move into and out of a corresponding cavity of the plurality of cavities.

12. The system of claim 10, wherein the sleeve is adapted to slide into the axial bore of the female body.

13. The system of claim 10, wherein the male connector further comprises a contact member connected to the male body at one end, and wherein the contact member comprises plastic, delrin, a soft metal, or combinations thereof.

14. A method for connecting and disconnecting a fluid connector assembly, the method comprising the steps of:
- locking a male connector with a female connector;
- sliding a sleeve about an elongate body of the male connector by moving a guide pin about a plurality of guide slots;
- sliding the sleeve into contact with a plurality of protrusions extending from the male connector through a plurality of apertures in the female connector, by disengaging the guide pin from a retaining member;
- forcing the plurality of protrusions to retract into the elongate body of the male connector to unlock the male connector from the female connector; and
- moving the male connector out of a tubular body of the female connector.

15. The method of claim 14, wherein the step of locking the male connector with the female connector comprises:
- moving the elongate body of the male connector into the tubular body of the female connector, wherein the male and the female connectors comprise axial bores extending therethrough;
- forcing the plurality of protrusions extending from the elongate body of the male connector to retract into the elongate body of the male connector;
- moving the elongate body of the male connector further into the tubular body of the female connector; and
- extending the plurality of protrusions into the plurality of apertures of the tubular body of the female connector, wherein the plurality of apertures extend laterally through the tubular body of the female connector to lock the male connector with the female connector, thereby joining the axial bore of the male connector with the axial bore of the female connector to define a flowpath for communicating a fluid.

16. The method of claim 15, wherein the step of forcing the plurality of protrusions extending from the elongate body of the male connector to retract into the elongate body of the male connector comprises contacting the plurality of protrusions extending from the elongate body of the male connector with the tubular body of the female connector.

17. The method of claim 14, wherein the step of forcing the plurality of protrusions to retract into the elongate body of the male connector comprises contacting the sleeve with the plurality of protrusions and forcing the plurality of protrusions to retract into a plurality of cavities extending into an external surface of the elongate body of the male connector.

* * * * *